(12) United States Patent
Helmers et al.

(10) Patent No.: US 8,689,560 B2
(45) Date of Patent: Apr. 8, 2014

(54) GAS TURBO SET AND METHOD FOR CONTROLLING A GAS TURBO SET

(75) Inventors: Lennard Helmers, Mühelm a.d. Ruhr (DE); Werner Krebs, Mühelm an der Ruhr (DE); Jaap van Kampen, Roermond (NL)

(73) Assignee: Siemens Aktiengesellschaft, München (DE)

( * ) Notice: Subject to any disclaimer, the term of this patent is extended or adjusted under 35 U.S.C. 154(b) by 805 days.

(21) Appl. No.: 12/601,055

(22) PCT Filed: May 16, 2008

(86) PCT No.: PCT/EP2008/056044
§ 371 (c)(1),
(2), (4) Date: Apr. 14, 2010

(87) PCT Pub. No.: WO2008/142020
PCT Pub. Date: Nov. 27, 2008

(65) Prior Publication Data
US 2010/0199627 A1    Aug. 12, 2010

(30) Foreign Application Priority Data
May 24, 2007   (EP) .................................. 07010377

(51) Int. Cl.
*F02C 3/16*   (2006.01)
(52) U.S. Cl.
USPC .............................. 60/735; 60/39.17; 60/791
(58) Field of Classification Search
USPC .................. 60/791, 39.17, 735, 774
See application file for complete search history.

(56) References Cited

U.S. PATENT DOCUMENTS

| | | | | |
|---|---|---|---|---|
| 2,504,181 A * | 4/1950 | Constant | ..................... | 60/226.1 |
| 2,989,843 A * | 6/1961 | Ferri | ..................... | 60/226.1 |
| 3,088,281 A | 5/1963 | Soltau | | |
| 5,647,200 A * | 7/1997 | Althaus | ..................... | 60/39.17 |
| 2007/0033945 A1* | 2/2007 | Goldmeer et al. | ............. | 60/774 |

FOREIGN PATENT DOCUMENTS

| | | |
|---|---|---|
| DE | 1145438 B | 3/1963 |
| DE | 2830724 A1 | 12/1979 |
| DE | 4232383 A1 | 3/1994 |
| DE | 4422701 A1 | 11/1995 |
| EP | 0646705 A1 | 4/1995 |
| GB | 279770 A | 11/1927 |
| JP | 7317567 A | 5/1995 |
| JP | 7150977 A | 6/1995 |
| JP | 11082170 A | 3/1999 |
| JP | 2604933 Y2 | 6/2000 |
| JP | 2007046611 A | 2/2007 |

OTHER PUBLICATIONS

Rolls Royce, "The Jet Engine", Jul. 1969, Rolls-Royce, Inc., 3rd Edition, p. 5.*

* cited by examiner

*Primary Examiner* — Andrew Nguyen

(57) ABSTRACT

A gas turbo set including a first turbine, a second turbine, and a combustion chamber connected between the first and second turbines and operated by auto-ignition is provided. The turbines and the combustion chamber are located on a common shaft that may be rotated about an axis. To increase the efficiency of the gas turbo set, the outer periphery of the second turbine is at a greater distance from the axis than that of the first turbine, leading to a reduction in the size and/or the number of turbine blades.

8 Claims, 1 Drawing Sheet

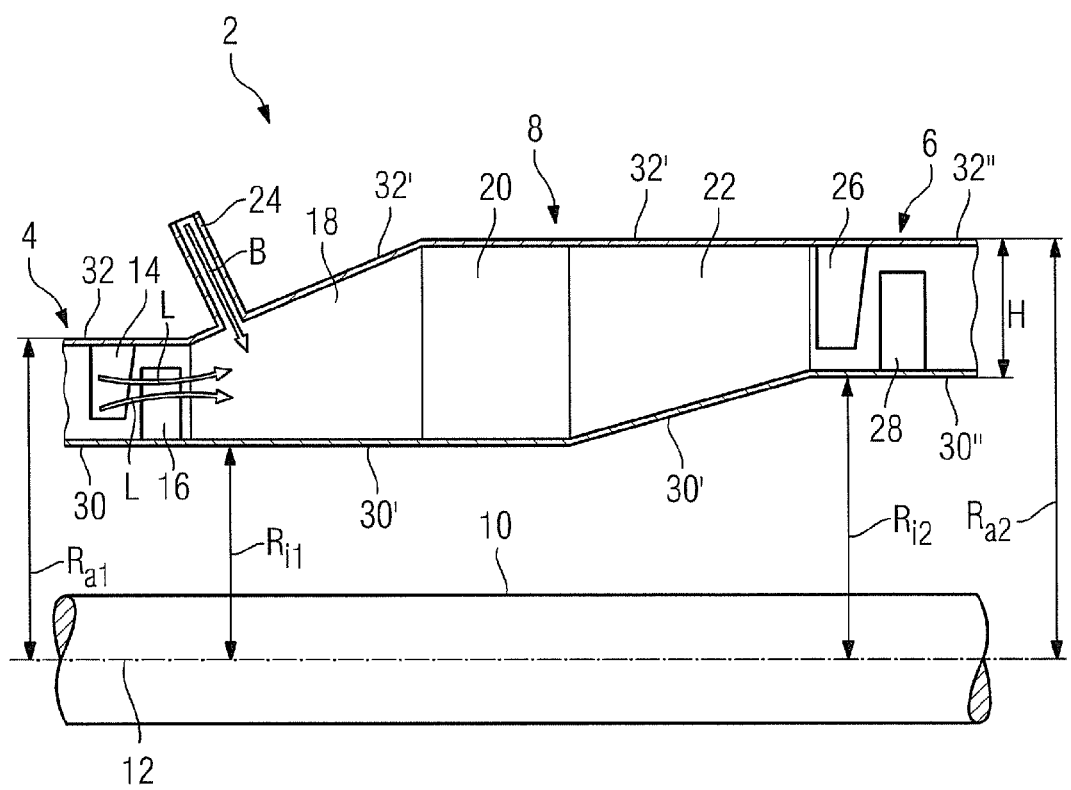

GAS TURBO SET AND METHOD FOR CONTROLLING A GAS TURBO SET

CROSS REFERENCE TO RELATED APPLICATIONS

This application is the US National Stage of International Application No. PCT/EP2008/056044, filed May 16, 2008 and claims the benefit thereof. The International Application claims the benefits of European Patent Office application No. 07010377.5 EP filed May 24, 2007, both of the applications are incorporated by reference herein in their entirety.

FIELD OF INVENTION

The invention relates to a gas turbo set, comprising a first and a second turbine as well as a combustion chamber connected therebetween, and operating by auto-ignition, said turbines being arranged on a shaft which can be rotated about an axis. The invention also relates to a method for controlling such a gas turbo set.

BACKGROUND OF INVENTION

With a gas turbo set comprising two gas turbines, a sequential combustion takes place, for which two e.g. annular combustion chambers and/or ring pipe combustion chambers are provided. One is arranged on the high pressure side and the other is arranged on the low pressure side. The combustion chamber on the high pressure side is supplied with compressed air, which is mixed with fuel and the mixture is ignited. Downstream of the high pressure combustion chamber is arranged a first gas turbine, a high pressure turbine, which is operated by the hot gases generated in the high pressure combustion chamber. Here the hot gases experience a partial cooling, but when leaving the high pressure turbine, nevertheless have a relatively high temperature, in the region between 900° C. and 1,400° C. for instance. A second low pressure combustion chamber is arranged downstream of the high pressure turbine which operates by auto-ignition and in which, in particular air not consumed in the first combustion chamber during combustion participates in a second combustion process. This low pressure combustion chamber essentially has the form of a gas-swept annular channel, into which fuel is injected. With a temperature of the exhaust gas from the high pressure turbine from 850° C., self-ignition of the injected fuel takes place in the low pressure combustion region, into which the second combustion process takes place in the gas turbo set. A second gas turbine, which is in particular a low pressure turbine, is arranged downstream of the low pressure turbine. It is important for the configuration of the low pressure combustion chamber for it to have an adequate length to ensure that exhaust gases and fuel mix well and for it to stay sufficiently long in the combustion chamber for complete combustion.

A gas turbo set of the type cited in the introduction emanates from the unexamined publication DE 44 22 701 A1 for instance. This unexamined publication describes a method for controlling the gas turbo set, in which a temperature of the exhaust gas from the first turbine is measured immediately ahead of the site of the auto ignition in the second combustion chamber and the fuel quantity for the different combustion chambers is controlled by the measured temperature.

A further gas turbo set can be inferred from the unexamined publication DE 42 32 383 A1, in which a screw-type swirl motion is imposed upon a gas flow in order to achieve a longer throughflow, or holding time in an annular combustion chamber between two turbines. To this end, the turbine located downstream of the combustion chamber has no first row of guide vanes so that the first row of guide vanes of this turbine is subjected to the swirl from the turbine arranged upstream thereof.

EP 0 646 705 indicates a gas turbo set comprising at least two turbines, which are arranged on a common shaft. Here the second downstream turbine is larger in volume than the first turbine.

SUMMARY OF INVENTION

The object underlying the invention is to specify a gas turbo set with an improved efficiency and a reduced Nox emission. The object underlying the invention is also to specify a method for controlling such a gas turbo set.

The object cited at the start is achieved in accordance with the invention by a gas turbo set, including a first and a second gas turbine as well a combustion chamber connected therebetween and operating by auto-ignition, said gas turbines being arranged on a shaft which can be rotated about an axis, with the second gas turbine having a larger outer periphery than the first turbine in respect of the axis and with the second turbine being arranged in a radial manner further outwards than the first turbine in respect of the axis.

The invention is based on the idea that with a second turbine, which has a larger outer periphery than the first turbine and/or is arranged in a radial manner further outwards in respect of the axis, particularly favorable flow conditions develop during operation in the downstream turbine which result in an increased efficiency of the gas turbo set. Nevertheless, to retain the working volume of the turbine, its height is configured to be smaller than that of the low pressure turbines from the prior art. Height is understood here to mean the distance between a radially internal and a radially external wall of the turbine and working volume is understood to mean the volume of the hollow annular interior of the turbine. As a result of the low height selected, the guide vanes and rotor blades of the second turbine are configured to be relatively small. Here the advantageous relation is used such that with an increasing radial distance of the blades from the axis of rotation, the force needed to rotate the turbine becomes ever smaller. The improved boundary conditions for driving the second turbine can also be used advantageously to reduce the number of blades, the manufacture of which is complicated and costly. The smaller embodiment and/or reduced number of blades also has a positive effect on the cooling requirements, since the blade surface to be cooled is smaller than in the known low pressure turbines. As the turbines are those which are driven by means of the exhaust gases from a combustion chamber, they are also referred to as gas turbines. The components of the gas turbo set can be arranged here on a common shaft. Alternatively, the high pressure and low pressure part of the gas turbo set can be arranged on separate shafts, which rotate at different speeds.

According to a preferred embodiment, a stream area of the combustion chamber which borders the first turbine is embodied in the manner of a diffuser. A diffuser is characterized by a cross-section which extends continuously, in particular consistently downstream. As a result of the ever increasing volume in the flow direction, the gas flow in the stream area slows down, thereby increasing its dwell time. This is an optimum condition for a particularly good mixing of the exhaust air from the first turbine with the injected fuel. By embodying the stream area in the manner of a diffuser, the combustion chamber can therefore have a shorter length than a combustion chamber with a constant cross-section.

The diffuser is embodied by preferably only the radial distance of a radial outer wall of the stream area increasing in respect of the axis. This enables a structurally simple realization of the diffuser, since, in other words only the outer form of the stream area is unchanged. A radial inner wall of the combustion chamber remains unchanged. The play available outwards in the radial direction is used here to embody the radial outer wall in a suitably inclined position in respect of the shaft, so that flow conditions with desired flow parameters develop in the stream area.

A fuel line is preferably provided, which opens into the diffuser. The fuel line preferably opens into a front region of the diffuser, which region corresponds to approximately half of the axial length and in particular approximately ⅓ of the axial length of the diffuser. As a result of the still high speed of the gas flow at the start of the diffuser, the static temperature in this region is relatively low. This slows down the auto-ignition of the fuel-exhaust air mixture in the stream area, as a result of which the fuel can mix particularly well with the exhaust air from the first gas turbine. This in turn results in a reduction in the nitrogen oxide during the combustion process. Since, due to the proposed arrangement of the fuel line, the largest part of the diffuser length is used to mix the fuel with the exhaust air, with the gases lasting long enough in the diffuser to achieve a high mixing degree, the overall length of the combustion chamber can be kept relatively short.

According to a preferred variant, a combustion region of the combustion chamber which borders the second turbine is embodied in the manner of a nozzle. Contrary to the stream area, the combustion region here comprises a continuously, in particularly consistently narrowing cross-section in the flow direction. In the nozzle, the exhaust gases are accelerated again following combustion, as a result of which the dynamic pressure increases so that the low pressure turbine is driven by the accelerated gas flow. This design is particularly suited to attainment of the pressure needed to drive the low pressure turbine.

The nozzle is embodied by preferably only the radial distance of a radial inner wall of the combustion region increasing in respect of the axis. The largest radial distance of the radial outer wall, which is reached in the region of the diffuser, is retained in the combustion region. To embody the nozzle, the radial inner wall of the combustion region is exclusively embodied at an incline in respect of the axis, so that this wall extends in a radial manner further from the axis in the flow direction.

A mixing region is expediently provided between the stream area and the combustion region, the radial inner wall of which has the same distance from the axis as the combustion region and the radial outer wall of which has the same distance from the axis as the combustion region. The mixing region thus forms part of the combustion chamber with the largest cross-section. Here the gas flow in the mixing region is at its slowest, and/or has the longest dwell time, so that a maximum mixing of the fuel with the exhaust air from the first gas turbine takes place. A suitably selected length of the mixing region allows the desired dwell time of the gas flow in the combustion chamber to be adjusted in a simple fashion. The selected form of the wall contour also prevents backflows from the gas flow. Furthermore, the proposed design of the combustion chamber also suppresses the formation of dead zones.

The second-mentioned object is achieved in accordance with the invention by a method for controlling a gas turbo set including a first and a second gas turbine as well as a combustion chamber connected therebetween and operating by auto-ignition, said turbines being arranged on a common shaft that can be rotated about an axis, with a gas flow connected to the first turbine being guided through the combustion chamber to the second turbine which is disposed in a radial manner further outwards in respect of the axis.

The advantages and preferred embodiments detailed in respect of the gas turbo set can in turn be transferred to the method.

BRIEF DESCRIPTION OF THE DRAWINGS

An exemplary embodiment of the method is described in more detail with reference to a drawing. The single FIGURE shows a schematic representation of a gas turbo set with a combustion chamber, which is arranged between two turbines.

DETAILED DESCRIPTION OF INVENTION

The turbo set 2 according to the FIGURE essentially includes a first turbine 4, a second turbine 6 and an annular combustion chamber 8 connected therebetween. The two turbines 4, 6 and the combustion chamber 8 are disposed on a common rotor shaft 10, which is arranged so as to be rotatable about an axis 12. In this exemplary embodiment, the turbine 4 is a high pressure gas turbine and the turbine 6 represents a low pressure gas turbine in a power plant.

A front combustion chamber is connected upstream of the high pressure turbine 4, which is not shown in more detail in FIGURE. In the front combustion chamber, a fuel-air mixture is combusted, to which the blades of the high pressure gas turbine 4 are subjected. A last row of guide vanes of the high pressure turbine 4 is specified in the figure by a guide vane 14 and a last row of rotor blades by a rotor blade 16.

The gas mixture flowing through the high pressure turbine 4 still contains air which has not taken part in the combustion process. This exhaust air is shown with arrows L. The exhaust air L is fed into the combustion chamber 8 downstream of the high pressure turbine 4. In this exemplary embodiment the combustion chamber 8 consist of three regions: a stream area 18, a mixing region 20 and a combustion region 22. A fuel line 24 opens at the start of the stream area 18, via which a particularly gaseous fuel B is introduced into the combustion chamber. In the stream area 18 and in the subsequent mixing region 20, a mixing of the exhaust air L with the fuel B takes place, before the gas mixture in the combustion region 22 ignites upon reaching a temperature of above 850° C.

The exhaust gas flow from the combustion chamber 8 is finally routed into the low pressure combustion chamber 6. A first row of guide vanes and a first row of rotor blades is shown in the low pressure combustion chamber 6 by a guide vane 26 and a rotor blade 28 respectively.

Viewed from the axial section, the turbines 4, 6 and the combustion chamber 8 each comprise a cylindrical radial internal wall 30, 30', 30", also known as inner wall, which is surrounded by a particularly concentrically arranged radial external wall 32, 32', 32', also referred to as outer wall. The inner walls 30, 30', 30" border the shaft 10 or are formed by the shaft 10 itself. An annular space is therefore formed between the inner walls and the outer walls respectively. The outer walls 32, 32', 32" represent a cover of the respective components 4, 5, 8 of the gas turbo set 2, which can be combined in particular in the manner of a single housing.

The inner wall 30 of the first turbine 4 has a radial distance $R_{i1}$ and the outer wall 32 has a distance $R_{a1}$ relative to the axis 12. In the gas turbo set 2 shown in the FIGURE, the second turbine 6 is arranged in a radial manner further outwards in respect of the axis 12 than the first turbine 4. This means that the inner wall 30" of the second turbine 6 has a radial distance $R_{i2}$ from the axis 12, which is larger than the radial distance $R_{i1}$. At the same time, the radial distance $R_{a2}$ of the outer wall 32" of the second turbine 6 is similarly larger than the radial distance $R_{a1}$ of the first turbine 4.

As a result of the radial position of the low pressure turbine 6 which is arranged further outwards, less force is needed to drive the turbine 6 than would be the case if it were at the same radial level as the first turbine 4. This results in particularly effective flow conditions in the second turbine 6 so that a height H of the second turbine 6 can be kept relatively small. The correspondingly small dimensioning of the blades 26, 28 of the turbine 6 also reduces the consumption of cooling air to cool these blades 26, 28. Overall, compared with the known gas turbo set, in which both turbines are located at the same radial distance from the axis (see in particular DE 42 32 383 A1) or in which the second turbine is radially lower than the first turbine (DE 44 22 701 A1), a higher efficiency is achieved by means of simple structural changes to the gas turbo set 2.

In this exemplary embodiment, the structural measures for embodying the second turbine 6 to be arranged in a radial manner further outwards then the first turbine 4 include a consistent extension of the cross-section of the stream area 18 and a simultaneously consistent narrowing of the cross-section of the combustion region 22. It is important here for only the radial distance of the outer wall 32' of the stream area 18 to increase in the flow direction, while the inner wall 30' of the combustion chamber 8 in the region of the stream area 18 remains at the same radial level as the inner wall 30 of the first gas turbine 4. The outer wall 32' is therefore already at the highest radial distance from the axis 12 at the mixing region 20.

The stream area 18 is thus embodied in the manner of a diffuser. This has the effect that the fuel-exhaust air mixture in the flow direction slows down, as a result of which its dwell time in the combustion chamber 8 increases. The exhaust air L and the fuel B can therefore mix well, so that a special combustion with a low static temperature takes place, in which a reduced quantity of nitrogen oxide is produced.

The dwell time of the gases in the combustion chamber 8 can essentially be adjusted by two parameters. This can take place on the one hand by way of the speed to which the gases L, B in the diffuser are decelerated. This speed is a function of the angle of inclination of the outer wall 32' and the length of the stream area 18. The dwell time can on the other hand also be influenced by the length of the mixing region 20, if such a mixing region 20 is specified.

Mounting the second turbine 6 in a radially higher position in respect of the first turbine 4 takes place in a second step in the region of the combustion region 22, which is embodied in the manner of a nozzle. Here the outer wall 32' of the combustion chamber 8 remains at the highest radial distance $R_{a2}$. Only the inner wall 30' of the combustion chamber 8 is changed, by the wall 30' being brought into an inclined position so that its radial distance in the flow direction increases continually from $R_{i1}$ to $R_{i2}$. When passing through the combustion chamber 8, the gas flow is guided here from a radial inner position in respect of the axis 12, which corresponds to the radial position of the first turbine 4, to a radial position arranged further outwards, which is defined by the position of the second turbine 6.

The invention claimed is:

1. A gas turbo set, comprising: a first, high pressure, turbine;
a second, low pressure, turbine positioned to receive air which has passed through the first high pressure turbine;
a combustion chamber connected between the first turbine and the second turbine and operated by auto-ignition such that the second, low pressure turbine is positioned to receive the air after the air first passes from the first, high pressure turbine, and then through the combustion chamber before being received by the second, low pressure turbine; and
a first shaft,
wherein the first turbine and the second turbine are arranged on the first shaft which may be rotated about an axis,
wherein a second outer periphery of the second, low pressure, turbine is larger than a first outer periphery of the first, high pressure, turbine with respect to the axis,
wherein the second, low pressure, turbine is arranged radially further outwards from the axis than the first, high pressure, turbine, and
wherein the combustion chamber includes a stream area arranged next to the first turbine, a mixing region positioned between the stream area and the second turbine, with the stream area embodied as a diffuser for which a first radial distance of a stream area radial outer wall increases in a flow direction with respect to the axis while the mixing region and the combustion region extend both along an outer wall along which a second radial distance remains constant with respect to the axis while the combustion region extends along an inner wall having a third radial distance which increases in the flow direction with respect to the axis so there is a narrowing of the cross section of the combustion region in the flow direction, wherein fuel-ducting means lead into the diffuser to lead fuel into the diffuser.

2. The gas turbo set as claimed in claim 1, wherein the fuel-ducting means leads into a front region of the diffuser, and wherein the front region corresponds to ½ of an axial length of the diffuser.

3. The gas turbo set as claimed in claim 1, wherein the fuel-ducting means leads into a front region of the diffuser, and wherein the front region corresponds to ⅓ of the axial length of the diffuser.

4. The gas turbo set as claimed in claim 1, wherein the combustion region of the combustion chamber arranged next to the second turbine is embodied as a nozzle.

5. A method for controlling a gas turbo set, comprising:
providing a first high pressure turbine and a second low pressure turbine as well as a combustion chamber connected between the first and second turbines, so that the second low pressure turbine is positioned to receive air which first passes through the first high pressure turbine, then through the combustion chamber before being received by the second, low pressure turbine;
arranging the first and second turbines on a common shaft which can be rotated about an axis;
arranging the second turbine radially further outward than the first turbine with respect to the axis; and
guiding a gas flow connected to the first turbine through the combustion chamber to the second turbine,
wherein the combustion chamber is operated by auto-ignition, and
providing in the combustion chamber a stream area arranged next to the first turbine, a mixing region positioned between the stream area and the second turbine, and a combustion region positioned between the mixing region and the second turbine, with the stream area embodied as a diffuser for which a first radial distance of a stream area radial outer wall increases in a flow direction with respect to the axis while the mixing region and the combustion region extend both along an outer wall along which a second radial distance remains constant with respect to the axis while the combustion region extends along an inner wall having a third radial distance which increases in the flow direction with respect to the axis so there is a narrowing of the cross section of the combustion region in the flow direction, wherein fuel-ducting means lead into the diffuser to lead fuel into the diffuser.

6. The method as claimed in claim 5, wherein the fuel-ducting means leads into a front region of the diffuser, and wherein the front region corresponds to ½ of an axial length of the diffuser.

7. The method as claimed in claim 5, wherein the fuel-ducting means leads into a front region of the diffuser, and wherein the front region corresponds to ⅓ of the axial length of the diffuser.

8. The method as claimed in claim 5, wherein the combustion region of the combustion chamber arranged next to the second turbine is embodied as a nozzle.

* * * * *